US008671558B2

(12) United States Patent
Kihara

(10) Patent No.: US 8,671,558 B2
(45) Date of Patent: Mar. 18, 2014

(54) DEVICE FOR CRIMPING ELECTRIC WIRE TERMINAL

(75) Inventor: Etsuro Kihara, Shiga (JP)

(73) Assignees: The Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 13/587,475

(22) Filed: Aug. 16, 2012

(65) Prior Publication Data

US 2012/0304461 A1 Dec. 6, 2012

Related U.S. Application Data

(60) Division of application No. 12/465,690, filed on May 14, 2009, now Pat. No. 8,266,799, which is a continuation of application No. PCT/JP2007/072025, filed on Nov. 13, 2007.

(30) Foreign Application Priority Data

Nov. 17, 2006 (JP) ................................ 2006-311439
Mar. 20, 2007 (JP) ................................ 2007-072651

(51) Int. Cl.
*B23P 19/00* (2006.01)
*H01R 43/00* (2006.01)

(52) U.S. Cl.
USPC ............... 29/748; 29/33 F; 29/33 M; 29/753; 29/760; 29/761

(58) Field of Classification Search
USPC ........ 29/748, 33 F, 33 M, 745, 747, 751, 753, 29/760, 761, 857, 861, 863, 867
See application file for complete search history.

(56) References Cited

U.S. PATENT DOCUMENTS

| | | | |
|---|---|---|---|
| 3,707,756 | A | 1/1973 | Wolyn |
| 5,606,795 | A | 3/1997 | Ohba et al. |

(Continued)

FOREIGN PATENT DOCUMENTS

| | | |
|---|---|---|
| JP | 51-55980 | 4/1976 |
| JP | 6-223646 | 8/1994 |

(Continued)

OTHER PUBLICATIONS

Office Action issued on Oct. 4, 2010, in Japanese Patent Application No. 2007-072651 (with English Translation).

(Continued)

*Primary Examiner* — Thiem Phan
(74) *Attorney, Agent, or Firm* — Oblon, Spivak, McClelland, Maier & Neustadt, L.L.P.

(57) ABSTRACT

A terminal crimping device where an electric wire is moved from a wire stripping section to a terminal crimping section, with both ends of the wire held by two wire holding hands of a wire conveying hand, and is subjected to terminal crimping processing by terminal crimping pressing devices. The terminal crimping device has the second wire conveying hand for conveying the wire at the terminal crimping section. The wire conveying hand conveys the wire without passing it from one side of the wire crimping pressing devices to the other side, so that an occurrence of a holding failure of the wire is suppressed even if the number of the terminal crimping pressing devices is increased or the conveyance speed of the wire is increased.

14 Claims, 12 Drawing Sheets

(56) References Cited

U.S. PATENT DOCUMENTS

| | | | | |
|---|---|---|---|---|
| 6,722,021 | B2 * | 4/2004 | Takada | 29/753 |
| 6,990,730 | B2 * | 1/2006 | Fujita et al. | 29/749 |
| 7,134,190 | B2 | 11/2006 | Bungo et al. | |
| 2004/0143966 | A1 | 7/2004 | Soriano | |

FOREIGN PATENT DOCUMENTS

| | | |
|---|---|---|
| JP | 7-29662 | 1/1995 |
| JP | 7-240121 | 9/1995 |
| JP | 9-161939 | 6/1997 |
| JP | 10-112229 | 4/1998 |
| JP | 2000-123944 | 4/2000 |

OTHER PUBLICATIONS

European Search Report issued May 7, 2012 in European Patent Application No: EP 07831755.9.

Office Action issued Jun. 22, 2011 in Japan Application No. 2007-072651 (With English Translation).

* cited by examiner

DEVICE FOR CRIMPING ELECTRIC WIRE TERMINAL

CROSS-REFERENCE TO RELATED APPLICATIONS

This application is a divisional of U.S. Ser. No. 12/465,690 filed May 14, 2009, the entire content of which is incorporated herein by reference, and is based upon and claims the benefit of priority from International Application No. PCT/JP07/72025, filed Nov. 13, 2007, which claims priority under 35 U.S.C. 119 to Japanese Application Nos. 2006-311439 filed Nov. 17, 2006 and 2007-072651 filed Mar. 20, 2007.

FIELD OF THE INVENTION

The present invention relates to a device for crimping a terminal of an electric wire and a method for crimping a terminal of an electric wire used for manufacturing wire harness used in vehicles such as automobiles.

BACKGROUND OF THE ART

Generally, devices for manufacturing wire harness used in vehicles such as automobiles are comprised of: a means for cutting long electric wire in a predetermined length; a means for stripping jacket on both ends of the electric wire; a means for crimping the end of the electric wire to a terminal; and a means for inserting the terminal crimped to the electric wire in a connector housing. (e.g., refer to Patent Documents 1-3).

For example, such prior art wire harness manufacturing device is comprised of an electric wire terminal crimping device as shown in FIG. 10.

The electric wire terminal crimping device is comprised of: an electric wire measuring section 80 for measuring the electric wire; a stripping section 100 for stripping jacket on both ends of the electric wire; a terminal crimping section 60 for crimping the terminals at the ends of the electric wire; a terminal-position regulating section 70 for regulating the posture of the terminal; and a terminal-inserting section 110 for inserting the terminal attached wire in a connector housing.

In such an electric wire terminal crimping device, the electric wire 140 is fed a predetermined amount at the electric wire measuring section 80 and the electric wire 140 is sent into a U-turn mechanism (not illustrated), and thereby, terminal at the downstream end of the electric wire 140 is made to do a U-turn and then held with the electric wire holding hand 101. Thereafter, the electric wire 140 is measured and is driven at the electric wire measurement section 80, and after the measurement ends, the electric wire 140 is cut by a cutter 90 and its terminal at the upstream end is held with the electric wire holding hand 101. At this point, both ends of the electric wire 140 which underwent measurement and cutting are held with the electric wire holding hand 101 and the wire forms a U-shape. The wire is then conveyed to respective process sections by means of an electric wire conveying method which will be described later.

Jackets on both ends of the U-shaped electric wire 140 are stripped off at the stripping section 100 and the terminals are then crimped to the ends at the terminal crimping section 60. A plurality of pressing device 60*a* is provided in the terminal crimping section 60 so as to enable the crimping of a plurality of types of terminals that configure the wire harness. Upon crimping the terminals, the electric wire holding hand 101 crimps the terminals by advancing the tip of the electric wire 140 inside the pressing device 60*a* by means of the distance adjusting mechanism 160 that adjusts the strokes of the air cylinder 150 as shown in FIGS. 11(A) and (B). FIG. 11(A) shows a situation before advancing the tip of the electric wire 140 whereas FIG. 11(B) shows a situation after advancing the tip.

Position of the terminal-attached electric wire 140*a* having the terminals which have been crimped is fixed in up-down and left-right directions by the terminal-position regulating section 70 and transferred to the terminal-inserting hand 110*a*. The terminal-inserting hand 110*a* is a robot having the X-Y-Z axes and it inserts the terminals of the terminal-attached electric wire 140*a* in the connector housing 130 which is placed in the connector receiving jig 120 positioned in the terminal-inserting section 110.

In the following, method of conveying the electric wire 140 to each process section mentioned above will be described.

The electric wire 140 held with the electric wire holding hand 101 is held with the electric wire conveying hand 103 placed on the electric wire conveying hand unit 102 provided in a parallel direction to each process section described above such as the electric wire measurement section 80, and the electric wire holding hand 101 releases the electric wire 140. Then, after an actuator 50 (e.g., air cylinder) moved the electric wire for a distance corresponding to the installed pitch of the process sections, the electric wire holding hand 101 grips the electric wire 140 once again. Then, the electric wire conveying hand 103 releases the electric wire 140 and the actuator 50 returns to its original position. Thus, the pitch conveyance of the electric wire 140 is carried out by means of the operation of grip-substituting the electric wire and the intermittent operation of the actuator 50.

Patent Document 1: Japanese Patent Application JP 06-223646 A1

Patent Document 2: Japanese Patent Application JP 07-29662 A1

Patent Document 3: Japanese Patent Application JP 07-240121 A1

DISCLOSURE OF THE INVENTION

Problems to be Solved by the Invention

In the above-described prior art device for crimping electric wire terminals, a plurality of pressing device 60*a* is provided for crimping the terminals, and grip-substituting of the electric wire is done every time for each move for a positioning spacing (one pitch) between the pressing devices 60*a*. Therefore, as the number of the pressing devices 60*a* increases or the speed at which the electric wire is conveyed becomes faster, the possibility of holding failure of the electric wire increases in the terminal crimping process performed by the plurality of pressing device 60*a*. This may lead to products defective in terminal crimping.

The present invention was invented by focusing attention on such problems involved in prior art, and it is an object of the present invention to provide an electric wire terminal crimping device and an method for crimping an electric wire terminal wherein products defective in terminal crimping due to holding failure of the electric wire is avoided.

Means for Solving the Problems

In order to solve the above-described problems, an electric wire terminal crimping device according to a first aspect of the present invention is comprised of: an electric wire crimping means for crimping a terminal at an end of an electric wire; and an electric wire conveying means for holding and conveying an end of said electric wire; and wherein a plurality of said electric wire crimping means is positioned in a row in a direction in which said electric wire is conveyed, said electric wire conveying means conveys said electric wire from one side of said plurality of electric wire crimping means to another side without said electric wire being grip-substituted, and conveyance of said electric wire is capable of being stopped at a discretional one of said plurality of electric wire crimping means.

In accordance with this aspect of the invention, since the electric wire conveying means conveys the electric wire from one side of the plurality of electric wire crimping means to another side without the electric wire being grip-substituted, even if the number of the electric wire crimping means increased or the conveying speed of the electric wire became faster, holding failure is suppressed and it is able to prevent defective products in terminal crimping due to the holding failure.

The electric wire terminal crimping device according to other aspect of the present invention is comprised of: an electric wire measurement means for measuring the electric wire and cutting it in a predetermined length; and a stripping means for stripping jacket on both ends of the electric wire; and wherein said electric wire conveying means includes: a first electric wire conveying hand for conveying said electric wire from said electric wire measurement means to said stripping means; a first driving means for reciprocating said first electric wire conveying hand between said electric wire measurement means and said stripping means; a second electric wire conveying hand for conveying said electric wire from one side of said plurality of electric wire crimping means to another side; and a second driving means for reciprocating said second electric wire conveying hand between one side of said plurality of electric wire crimping means and another side.

In accordance with this aspect of the invention, since the first electric wire conveying hand takes charge of conveying the electric wire from the electric wire measurement means to the stripping means and the second electric wire conveying hand takes charge of conveying the electric wire from one side of the plurality of electric wire crimping means to another side, there is no change in the posture of the terminal after crimping the terminal.

In the electric wire terminal crimping device according to other aspect of the present invention, two electric wire holding hands for holding both ends of said electric wire are respectively provided in said first electric wire conveying hand and said second electric wire conveying hand. In accordance with this aspect of the invention, since there are only four electric wire holding hands needed, the structure can be simplified and faults in the mechanisms can be reduced due to this simple structure.

In the electric wire terminal crimping device according to other aspect of the present invention, third driving means for moving the electric wire holding hands in a direction perpendicular to a conveying direction of said electric wire to a crimp working location of said electric wire crimping means is respectively provided in said two electric wire holding hands provided in said second electric wire conveying hand. In accordance with this aspect of the invention, the moving distance of the electric wire crimping means to the crimp working location can be suitably set with the third driving means that are respectively provided in the two electric wire holding hands of the second electric wire conveying hand, and thereby, changing the moving distance to the crimp working location is easier in case of change in the terminal.

The electric wire terminal crimping device according to other aspect of the present invention comprises a grip-substituting hand allocated between said stripping means and said plurality of electric wire crimping means, for receiving the electric wire whose jacket is stripped off from said first electric wire conveying hand and for passing it on to said second electric wire conveying hand. In accordance with this aspect of the invention, since the electric wire is gripped-and-substituted only once by the grip-substituting hand, damage to the electric wire by the two electric wire holding hands respectively provided in the first and second electric wire conveying hands is suppressed.

The electric wire terminal crimping device according to other aspect of the present invention comprises an electric wire protecting cover for covering outer side of said electric wire for entire area in which said electric wire moves from first to last electric wire crimping means among said plurality of electric wire crimping means. In accordance with this aspect of the invention, swinging of the electric wire that occurs when the electric wire is conveyed at high speed from the first electric wire crimping means to the last electric wire crimping means can be prevented by the electric wire protecting cover.

In the electric wire terminal crimping device according to other aspect of the present invention, said electric wire conveying means includes a single electric wire conveying hand for conveying said electric wire from one of said plurality of electric wire crimping means for a prior process to one of said plurality of electric wire crimping means for a later process. In accordance with this aspect of the invention, since the electric wire is conveyed with a single electric wire conveying hand from the electric wire measurement means to the electric wire conveying means, the structure can be simplified further.

The electric wire terminal crimping device according to other aspect of the present invention comprises an electric wire anti-swinging unit allocated in outer side of said electric wire in which its both ends are held with said two electric wire holding hands of said second electric wire conveying hand so that said electric wire is loop-shaped, for regulating position(s) of both sides or one side of said loop-shaped electric wire at position(s) apart from location where said both ends of said electric wire are held with said two electric wire holding hands; and an anti-swinging unit driving means for moving said electric wire anti-swinging unit between a first position located in a motion trajectory of said electric wire upon said electric wire is conveyed between one side of said plurality of electric wire crimping means to another side and a second position retracted from the motion trajectory.

In accordance with this aspect of the invention, upon the second electric wire conveying hand moves from one side of the plurality of electric wire crimping means to another side, position(s) for both sides or one side of the loop-shaped electric wire is regulated by means of the electric wire anti-swinging unit, and the fulcrum point at which the electric wire bends is located in the vicinity of the electric wire anti-swinging unit apart from the location where both ends of the electric wire are held with the two electric wire holding hands. Therefore, swinging of the electric wire in the direction opposite to the moving direction is suppressed. Thereby, the swung electric wire coiling around the electric wire crimping means or other mechanism parts is prevented. Further, since swinging of the electric wire during the movement becomes smaller, it is able to increase the electric wire conveying speed by setting high moving speed for the second electric wire conveying hand, and thereby, efficient working of the device is made possible. Depending on the individual characteristics of the electric wire, there is a possibility that the swinging phenomenon of electric wire may occur even if the moving speed of the second electric wire conveying hand is slow. However, since it is possible to lower the swinging of the electric wire, defective products due to damage to the electric wire can be reduced. This results in an improved yield rate and prevents malfunctioning of the device.

The electric wire terminal crimping device according to other aspect of the present invention comprises a cover for protecting internal structure of said second electric wire conveying hand, said electric wire anti-swinging unit, and said anti-swinging unit driving means, and wherein said electric wire anti-swinging unit is configured such that it protrudes from inner side to outer side of said cover to regulate position(s) on both sides or one side of the loop-shaped electric wire at said first position.

In accordance with this aspect of the invention, the internal structure of the second electric wire conveying hand, the electric wire anti-swinging unit, and the anti-swinging unit driving means can be protected with the cover.

The electric wire terminal crimping device according to other aspect of the present invention comprises an electric wire guiding member allocated such that there is spacing between itself and the cover on the cover, and wherein upon the electric wire is conveyed between one side of said plurality of electric wire crimping means to another side, said electric wire passes through the spacing between the cover and the electric wire guiding member.

In accordance with this aspect of the invention, during the above-described move, the electric wire passes through the spacing between the cover and the electric wire guiding member, and by making this spacing narrow to enable the electric wire to pass through it, the electric wire can be prevented from being swung above the cover by stopping it with the electric wire guiding member. During the above move, the electric wire guiding member prevents the electric wire from crossing over the electric wire anti-swinging unit.

In the electric wire terminal crimping device according to other aspect of the present invention, said electric wire anti-swinging unit is a guide rod capable of contacting outer side of the electric wire at both sides or one side of the loop-shaped electric wire when said electric wire anti-swinging unit is in said first position.

In accordance with this aspect of the invention, upon the above move, when position on one side or both sides of the electric wire is regulated by the guide rod, the fulcrum point at which the loop-shaped electric wire bends is in the vicinity of the guide rod that is placed apart from the position at which both the electric wire terminals are held with the two electric wire holding hands. Thereby, the guide rod can control the electric wire from swinging in a direction opposite to the moving direction.

In the electric wire terminal crimping device according to other aspect of the present invention, said electric wire anti-swinging unit is a dish-shaped guiding member comprising: a bottom wall for supporting the loop-shaped electric wire while in said first position; and side wall(s) capable of contacting both sides or one side of the loop-shaped electric wire.

In accordance with this aspect of the invention, since a dish-shaped guiding member is used as the electric wire anti-swinging unit, area of contact with the electric wire can be increased when the electric wire is being conveyed and swinging of the electric wire in a direction opposite to the moving direction can be controlled.

In the electric wire terminal crimping device according to other aspect of the present invention, at least one inner wall for regulating position(s) on both sides or one side of the electric wire cooperating with the side wall is provided on the bottom wall of the dish-shaped guiding member.

In accordance with this aspect of the invention, since the side wall and inner wall regulate the position on both sides or one side of the loop-shaped electric wire in coordination with each other, swinging of the electric wire in a direction opposite to the moving direction can be controlled.

A method for crimping terminals of an electric wire according to a second aspect of the present invention for cutting an electric wire and for crimping terminals to both ends of the electric wire, comprises: conveying an electric wire from one side of a plurality of electric wire crimping means to another side allocated in a row in conveying direction of the electric wire, without the electric wire being grip-substituted, and crimping the terminal by stopping conveyance of the electric wire at a discretional one of said plurality of electric wire crimping means.

In accordance with this aspect of the invention, since the electric wire is conveyed from one side of the plurality of electric wire crimping means to another side without the electric wire being grip-substituted, even if the number of electric wire crimping means increase or the speed at which the electric wire is conveyed is faster, holding failure on the electric wire is prevented, and thereby, the occurrence of defective terminal crimping in products is suppressed.

In the method for crimping terminals of an electric wire according to other aspect of the present invention, the following steps are carried out in this order: an electric wire measuring step for measuring an electric wire and cutting it in a predetermined length; a stripping step for stripping jacket at both ends of the electric wire; a terminal crimping step for crimping a terminal to an end of the electric wire; a terminal position regulating step for regulating position of the terminal of the terminal-attached electric wire; and a terminal inserting step for inserting the terminal-attached electric wire to a connector housing.

In accordance with this aspect of the invention, during the terminal crimping process, the electric wire is conveyed from one side of the plurality of electric wire crimping means which are placed in a row in the direction in which the electric wire is conveyed to another side without the electric wire being grip-substituted. Therefore, even when the number of electric wire conveying means increased or the speed at which the electric wire is conveyed became faster, holding failure on the electric wire can be prevented. This helps to prevent the occurrence of defective terminal crimping in the products. Moreover, as the electric wire is not being grip-substituted in the terminal crimping process, terminal-attached electric wires can be provided with stability for the terminal insertion process, and thereby, it helps to prevent the occurrence of defects in products arising due to the change in posture of the terminal.

In the method for crimping terminals of an electric wire according to other aspect of the present invention, conveyance of the electric wire from the electric wire measuring step to the stripping step is done by means of a first electric wire conveying hand, and conveyance of the electric wire at said terminal crimping step is done by means of a second electric wire conveying hand. In accordance with this aspect of the invention, since the first electric wire conveying hand is in charge of conveying the electric wire from the electric wire measurement process to the electric wire stripping process and the second electric wire conveying hand is in charge of conveying the electric wire in the terminal crimping process, the electric wire is not being grip-substituted in the crimping process and the posture of terminals does not change after crimping the terminals.

In the method for crimping terminals of an electric wire according to other aspect of the present invention, both ends of the electric wire are held with two electric wire holding hands respectively provided in said first electric wire conveying hand and said second electric wire conveying hand. In accordance with this aspect of the invention, since only four electric wire conveying hands are needed, the structure can be simplified and faults in the mechanisms can be reduced due to this simple structure.

In the method for crimping terminals of an electric wire according to other aspect of the present invention, the electric wire holding hand is moved to crimp working position of said plurality of electric wire crimping means by means of a third driving means respectively provided in the two electric wire holding hands of said second electric wire conveying hand. In accordance with this aspect of the invention, the moving distance of the terminal crimping device to the crimp working location can be suitably set by the third driving means that are respectively provided in the two electric wire holding hands of the second electric wire conveying hand, and thereby, changing the advancement distance to the crimp working location is made easy in case of change in the terminal.

In the method for crimping terminals of an electric wire according to other aspect of the present invention, an electric wire whose jacket has been stripped off is received from said first electric wire conveying hand and is passed on to said second electric wire conveying hand by means of a grip-substituting hand allocated between locations for said stripping step and said terminal crimping step. In accordance with this aspect of the invention, since the electric wire is gripped-and-substituted only once by the grip-substituting hand between the electric wire measurement process and the terminal crimping process, damage done to the electric wire by the electric wire holding hands can be suppressed.

BRIEF DESCRIPTION OF ACCOMPANYING DRAWINGS

FIG. 1 schematically depicts an arrangement showing an electric wire terminal crimping device according to a first embodiment of the invention.

FIG. 2 schematically depicts an arrangement showing a means for moving electric wire towards the terminal crimping pressing device in the electric wire terminal crimping device according to the first embodiment of the invention.

Figure 6:
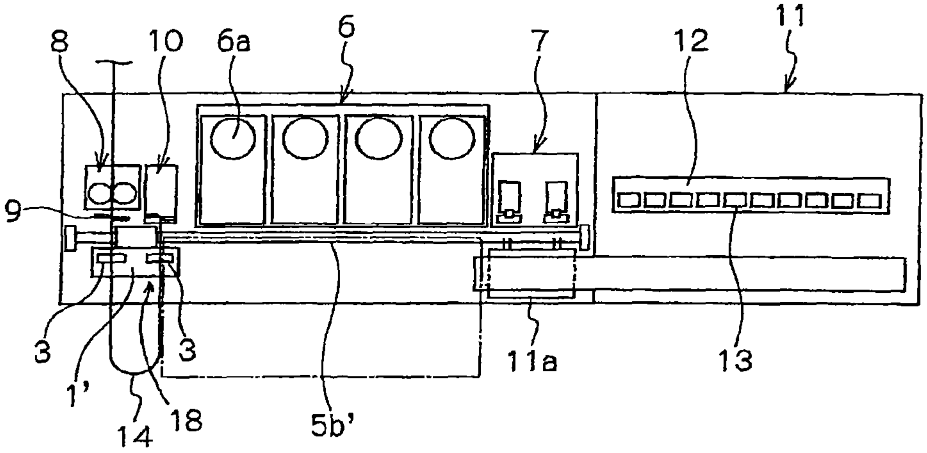

FIG. 6 schematically depicts an arrangement showing the electric wire terminal crimping device according to a second embodiment.

Figure 7:
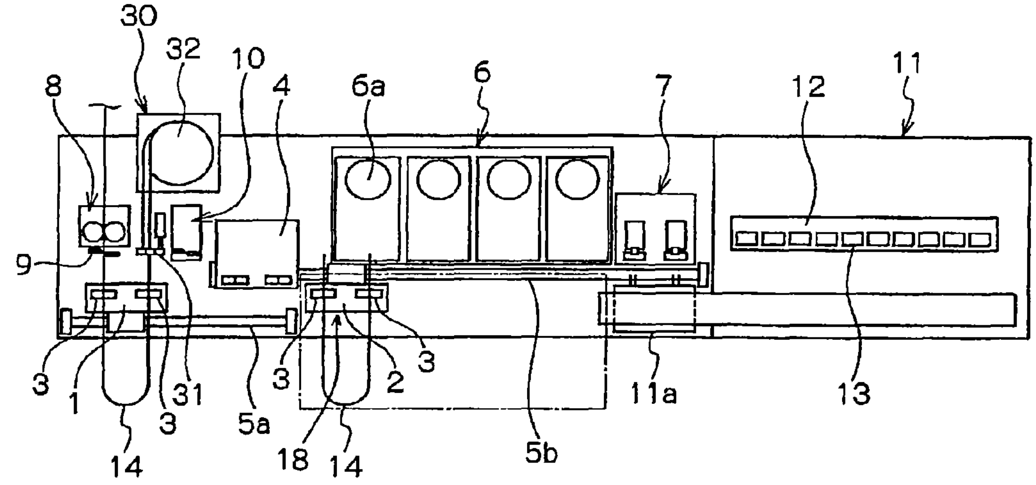

FIG. 7 schematically depicts an arrangement showing the electric wire terminal crimping device according to a third embodiment.

Figure 8:
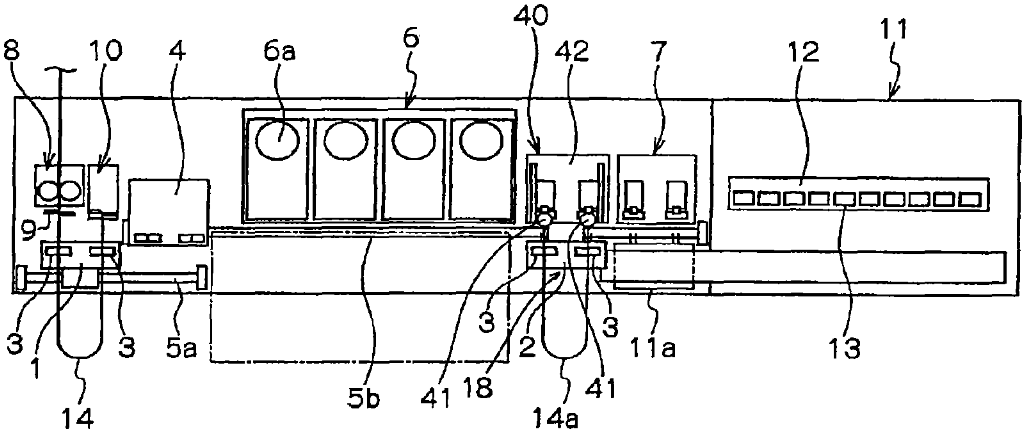

FIG. 8 schematically depicts an arrangement showing an electric wire terminal crimping device according to a fourth embodiment.

Figure 9:
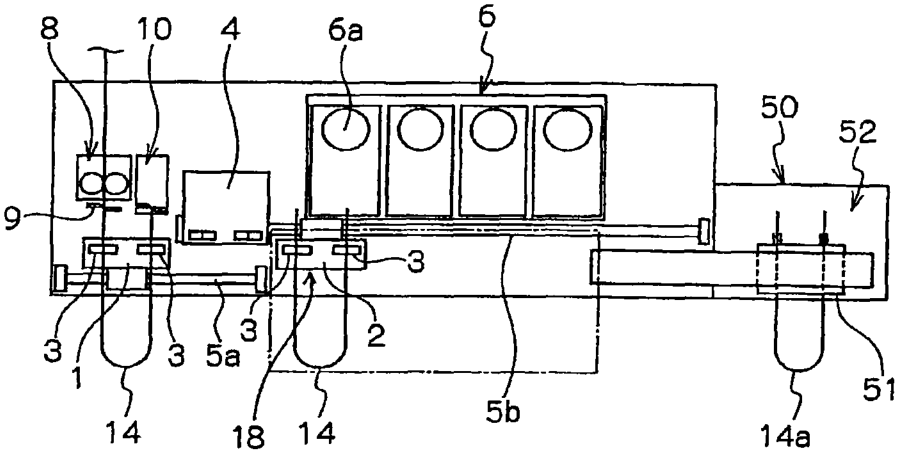

FIG. 9 schematically depicts an arrangement showing an electric wire automatic discharge device according to a fifth embodiment.

Figure 10:
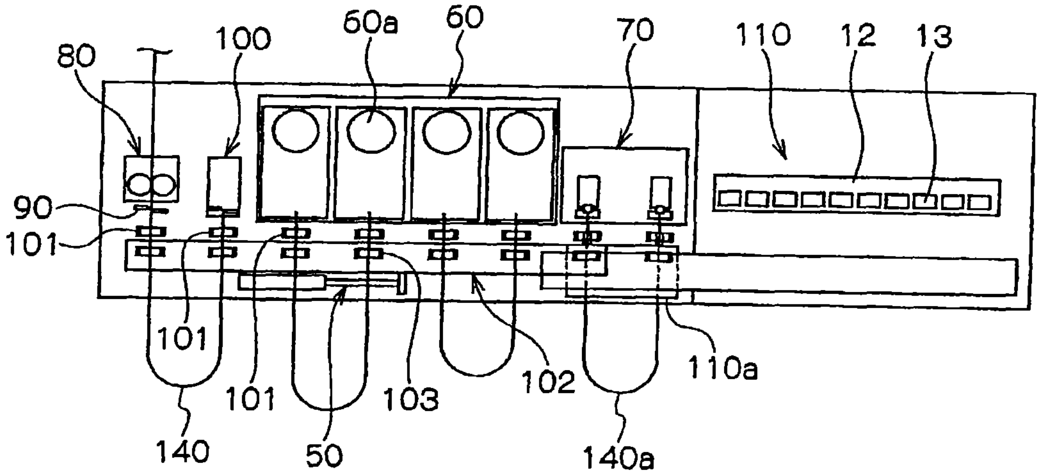

FIG. 10 schematically depicts an arrangement showing a prior art electric wire terminal crimping device.

Figure 11A:
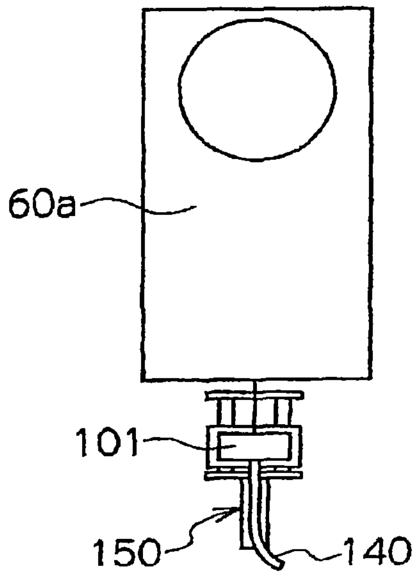
Figure 11B:
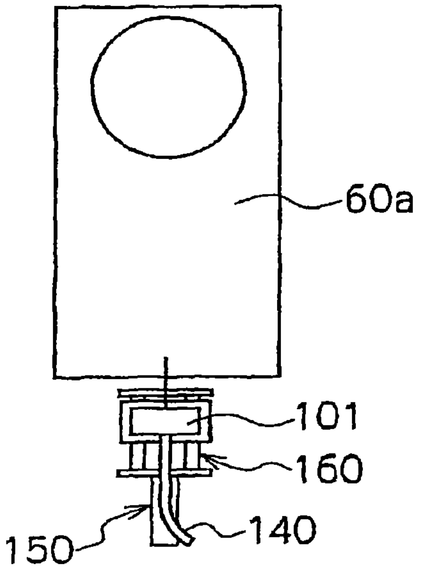

FIG. 11 schematically depicts an arrangement showing the electric wire moving means according to the prior art electric wire terminal crimping. FIG. 11(A) depicts a situation where the tip of the electric wire is in the position which is removed from the terminal crimping pressing device and FIG. 11(B) depicts a situation where the tip of the electric wire has advanced to the same pressing device.

Figure 12:
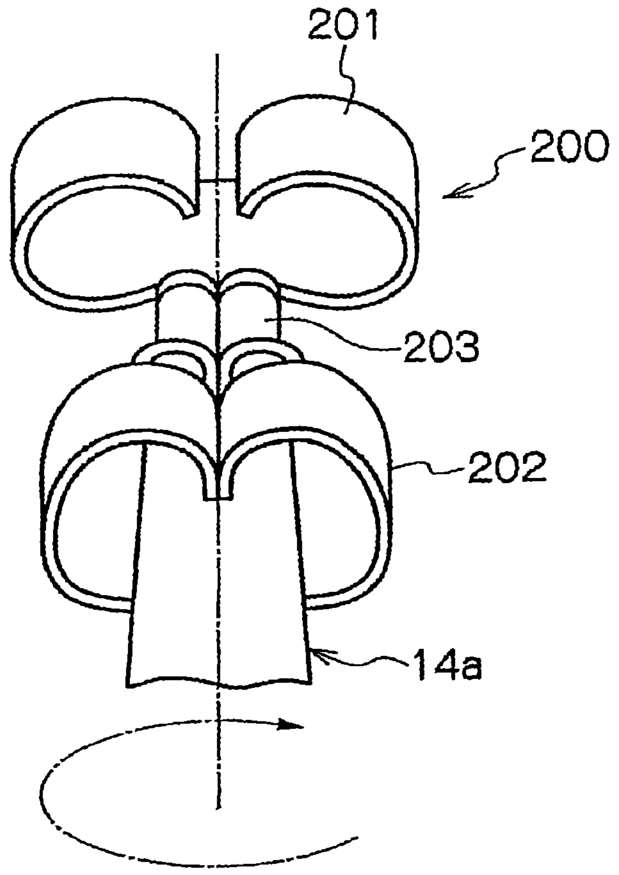

FIG. 12 depicts a perspective view showing a terminal-attached electric wire whose terminals are crimped at both ends of the electric wire.

Figure 13:
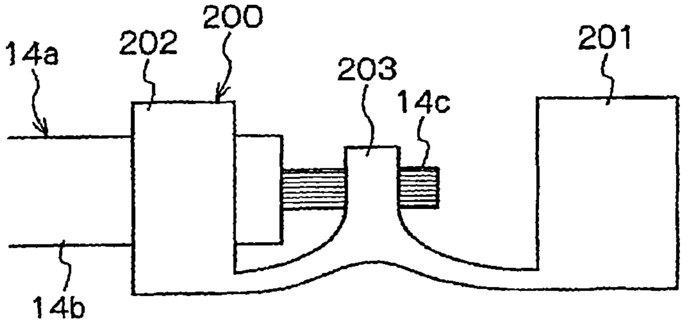

FIG. 13 depicts a side view showing a terminal-attached electric wire whose terminals are crimped at both ends of the electric wire.

Figure 14:
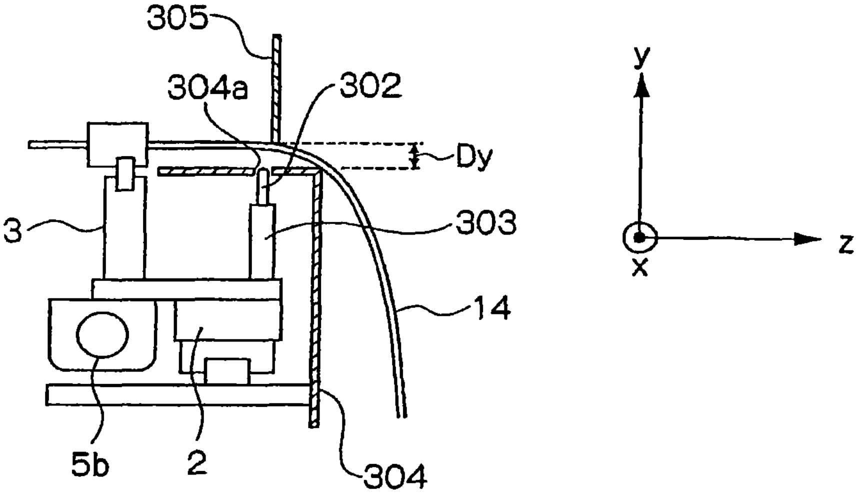

FIG. 14 depicts a characterizing portion of the electric wire terminal crimping device according to a sixth embodiment, and is a cross-section view showing a situation in which the guide rods are retracted.

Figure 15:
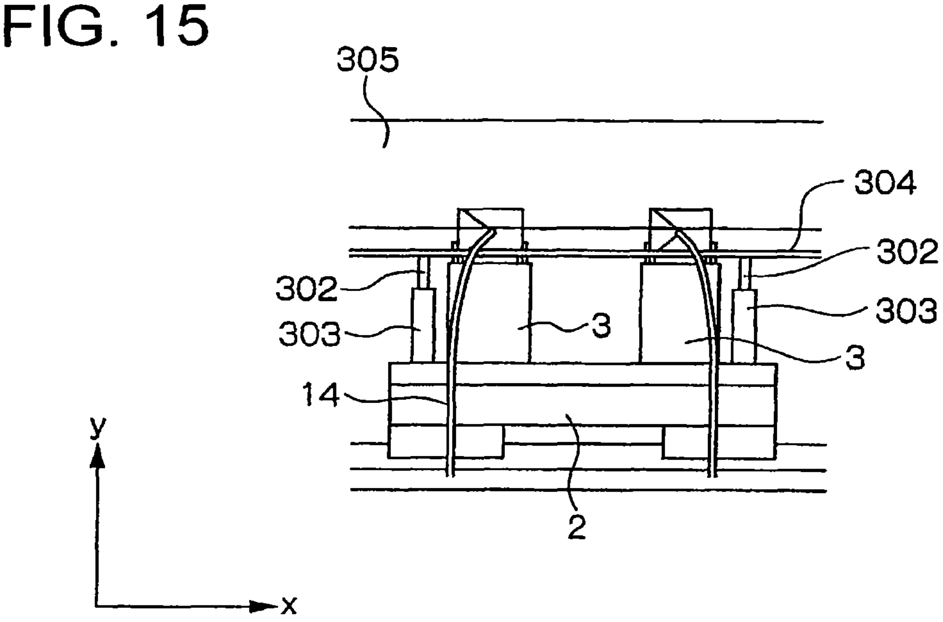

FIG. 15 depicts a front view showing the characterizing portion shown in FIG. 14.

Figure 16:
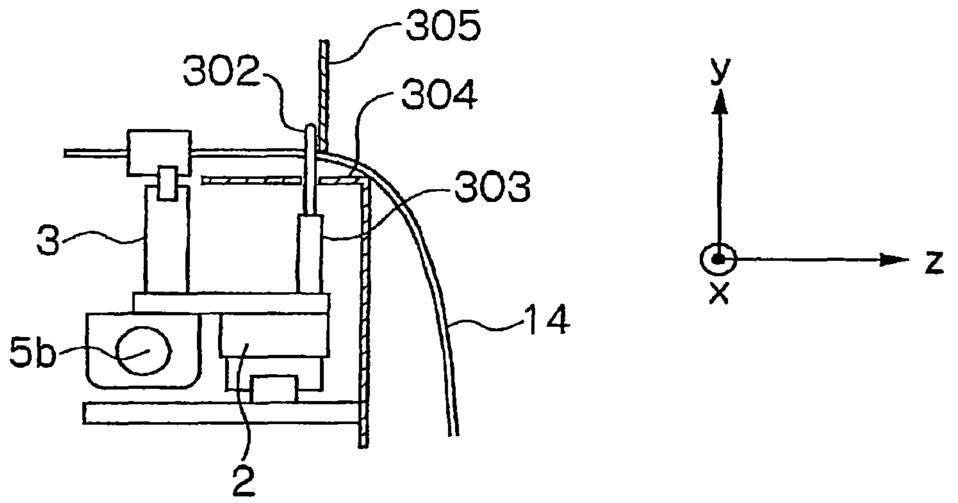

FIG. 16 depicts a cross-section view similar to FIG. 14, showing a situation in which the guide rods are protruded.

Figure 17:
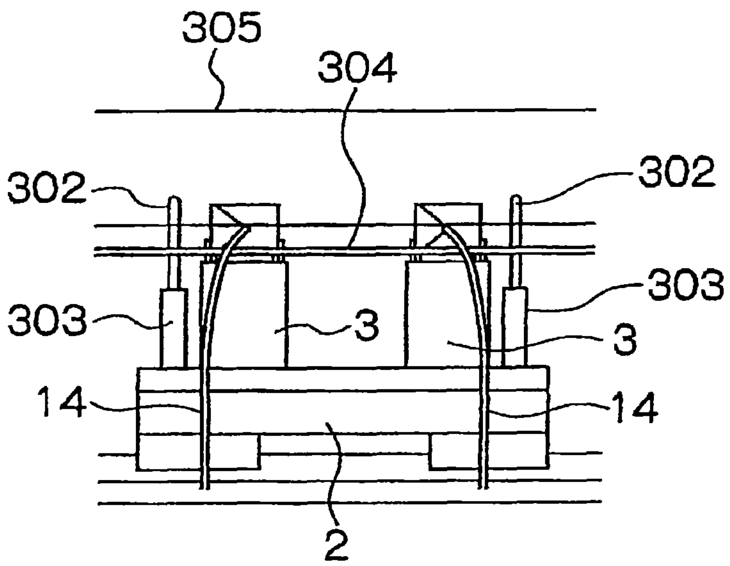

FIG. 17 depicts a front view similar to FIG. 15, showing a situation in which guide rods are protruded.

Figure 18A:
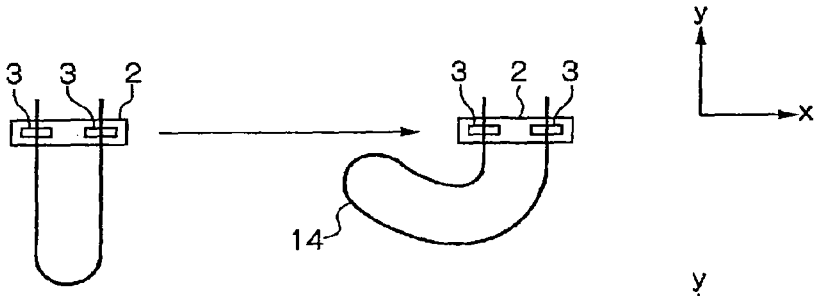
Figure 18B:
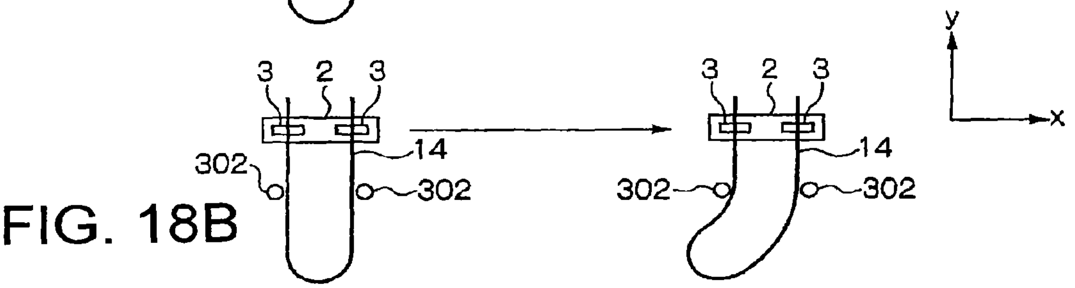

FIG. 18(A) depicts an illustration showing an electric wire rising phenomenon and FIG. 18(B) indicates a behavior of the electric wire in the electric wire terminal crimping device according to the sixth embodiment.

Figure 19:
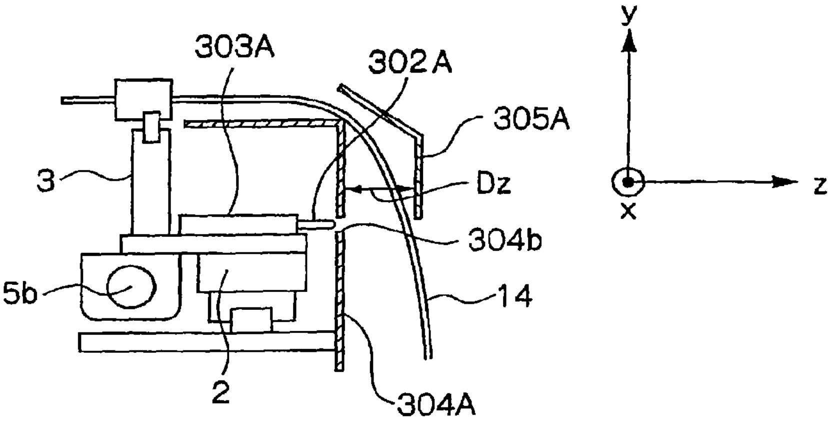

FIG. 19 depicts a characterizing portion of an electric wire terminal crimping device according to a seventh embodiment, and is a cross-section view showing a situation in which guide rods are retracted.

Figure 20:
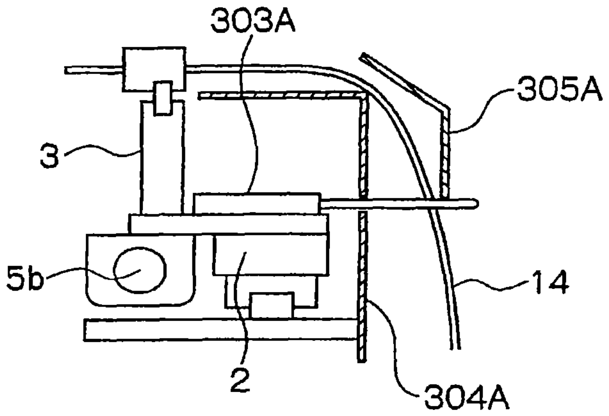

FIG. 20 depicts a cross-section view similar to FIG. 19, showing a situation in which the guide rods are protruded.

Figure 21:
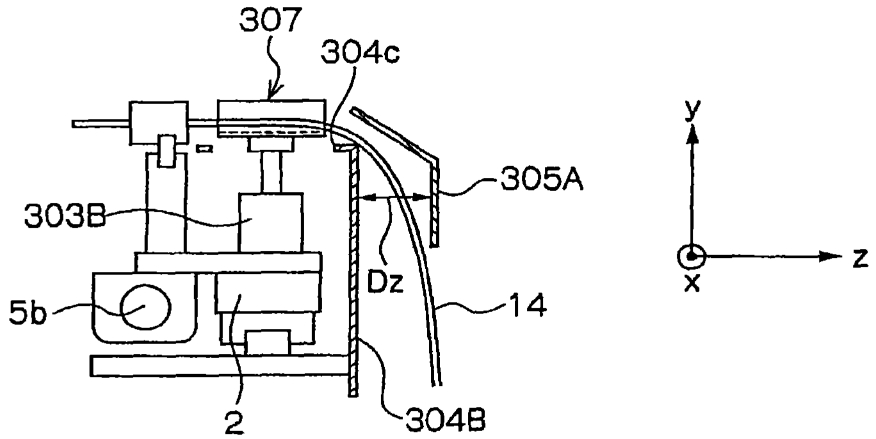

FIG. 21 depicts a characterizing portion of an electric wire terminal crimping device according to an eighth embodiment, and is a cross-section view showing a situation in which a dish-shaped guide rod is protruded.

Figure 22:
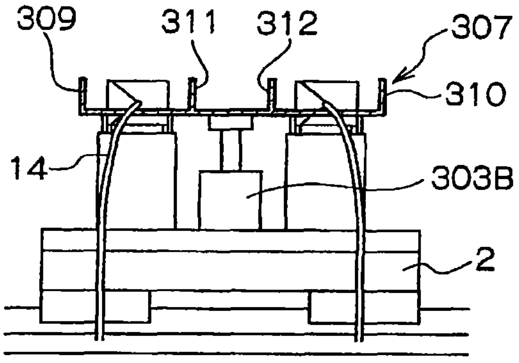

FIG. 22 depicts a front view showing a characterizing portion shown in FIG. 21.

Figure 23:
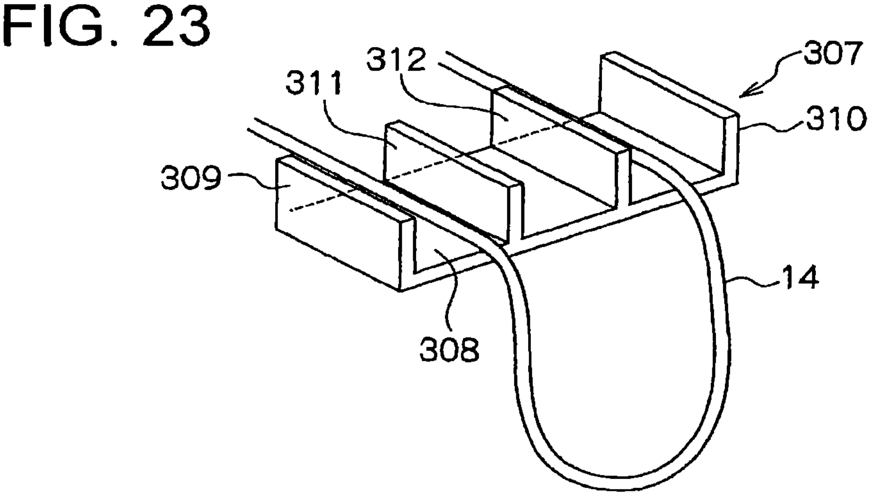

FIG. 23 depicts a perspective view showing a dish-shaped guide rod.

DESCRIPTION OF THE NUMERALS

1: first electric wire conveying hand
1': electric wire conveying hand
2: second electric wire conveying hand
3: electric wire holding hand
4: grip-substituting hand
5*a*: first conveying operation actuator
5*b*: second conveying operation actuator
5*b*': conveying operation actuator
6: terminal crimping section
7: terminal-position regulating section
8: electric wire measurement section
10: jacket stripping section
11: terminal-inserting section
11*a*: terminal-inserting hand
12: connector receiving jig
13: connector housing
14: electric wire
14*a*: terminal-attached electric wire
15: advancement actuator
30: waterproof-rubber-plug inserting section
18: electric wire conveying means

40: image inspecting section
302, 302, 302A, 302A: guide rod
303, 303, 303A, 303A, 303B: actuator
304, 304A: cover
304*a*, 303*b*: through-hole
305, 305A: electric wire guide
307: dish-shaped guiding member
308: bottom wall
309, 310: side wall
Dy, Dz: spacing

DETAILED DESCRIPTION OF PREFERRED EMBODIMENTS

Embodiments of the terminal crimping device according to the present invention will be described referring to the drawings.

First Embodiment

The terminal crimping device according to the first embodiment of the invention will be described referring to FIGS. 1-15.

Figure 1:
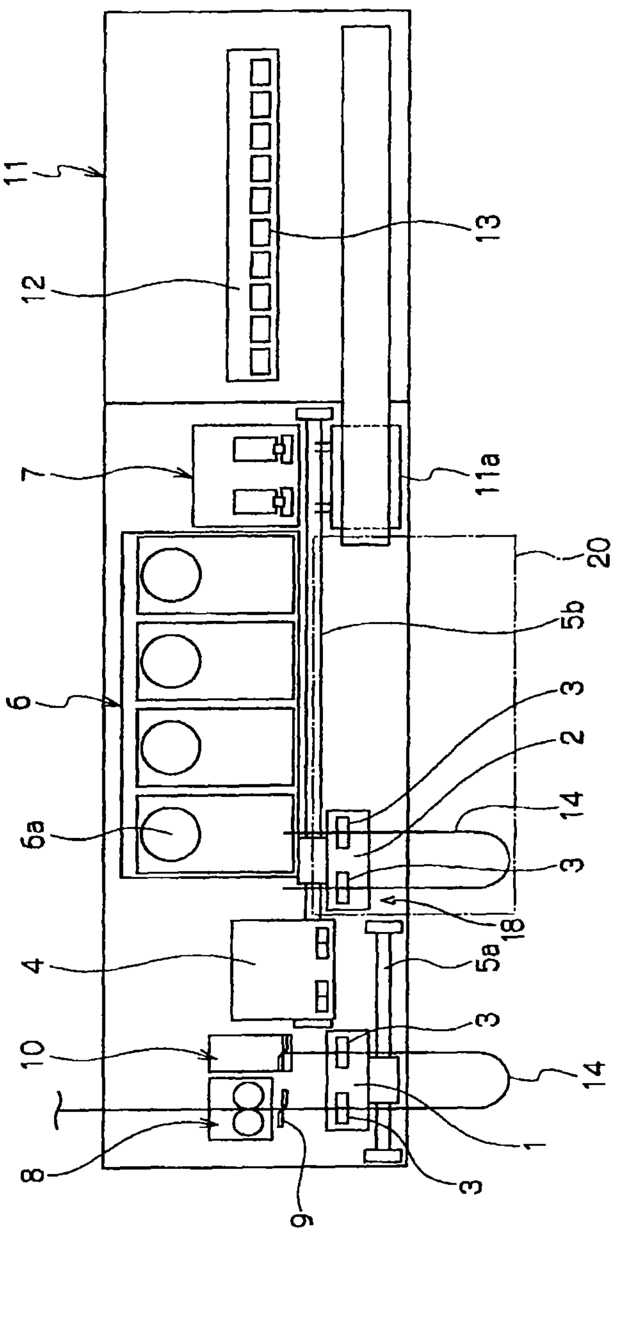

As shown in FIG. 1, the terminal crimping device is comprised of: an electric wire measurement section 8 for measuring an electric wire 14 and cutting it in a predetermined length; a stripping section 10 for stripping jacket on both ends of the electric wire 14; a terminal crimping section 6 for crimping terminals on the ends of the electric wire 14; a terminal-position regulating section 7 for regulating the posture of the terminal; and a terminal-inserting section 11 for inserting the terminal-attached electric wire in a connector housing 13.

In the terminal crimping section 6, a plurality of terminal crimping pressing device 6*a* that acts as electric wire crimping means is positioned in a row in a conveying direction of the electric wire.

The terminal crimping device includes an electric wire conveying means 18 for conveying the electric wire from one side (left side of FIG. 1) of the plurality of terminal crimping pressing device 6*a* to another side (right side of FIG. 1) without the electric wire being grip-substituted, and wherein the electric wire that is being conveyed can be stopped at a discretional terminal crimping pressing device 6*a* among the plurality of terminal crimping pressing device 6*a*.

The electric wire conveying means 18 is comprised of: a first electric wire conveying hand 1 for conveying the electric wire 14 between the electric wire measurement section 8 and the stripping section 10; and a second electric wire conveying hand 2 for conveying the electric wire 14 in the terminal crimping section 6. The first electric wire conveying hand 1 mainly conveys the electric wire 14 between the electric wire measurement section 8 and the stripping section 10. The second electric wire conveying hand 2 conveys the electric wire 14 in the installation section of the plurality of terminal crimping pressing device 6*a*.

The electric wire conveying means 18 is further comprised of: a first conveying operation actuator 5*a* that acts as a first driving means for reciprocating the first electric wire conveying hand 1 between the electric wire measurement section 8 and the stripping section 10; and a second conveying operation actuator 5*b* that acts as the second driving means for reciprocating the second electric wire conveying hand 2 in the terminal crimping section 6.

The first conveying operation actuator 5*a* is comprised of a servomotor and a ball screw thereby the first electric wire conveying hand 1 can be stopped at a position set in advance. Similarly, the second conveying operation actuator 5*b* is comprised of a servomotor and a ball screw thereby the second electric wire conveying hand 2 can be stopped at a position set in advance.

Two electric wire holding hands 3 that hold both ends of the electric wire 14 are respectively provided in the first electric wire conveying hand 1 and the second electric wire conveying hand 2. The first conveying operation actuator 5*a* can stop the first electric wire conveying hand 1 which holds both ends of the electric wire 14 with the electric wire holding hands 3, at a position of the electric wire measurement section 8 and a position of the stripping section 10, respectively. Furthermore, the second conveying operation actuator 5*b* can stop the second electric wire conveying hand 2 that holds both ends of the electric wire 14 whose jacket at the both ends is stripped off at a location for a specified one (first terminal crimping pressing device 6*a* in this example) among the plurality of terminal crimping pressing device 6*a* (four pressing devices in this example).

Figure 2:
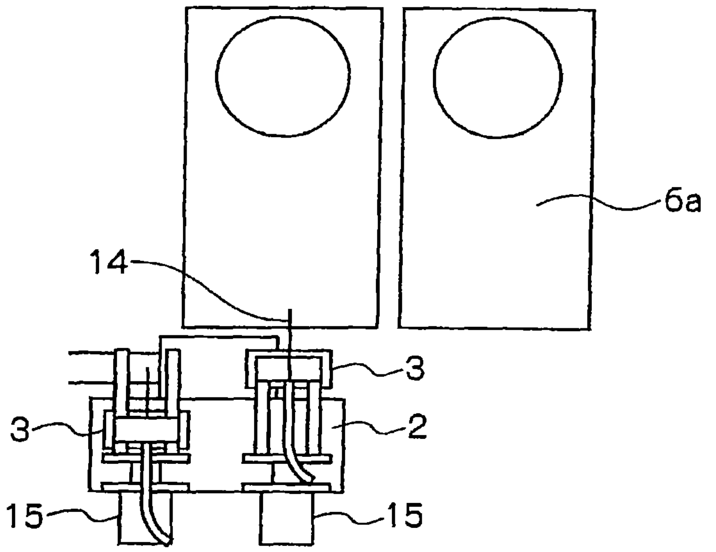

At the two electric wire holding hands 3, 3 provided in the second electric wire conveying hand 2, advancement actuators 15 are respectively provided which act as a third driving means that moves the electric wire holding hands 3 to the crimp working location of the terminal crimping pressing device 6*a* in a direction perpendicular (up-down direction in FIG. 1) to the direction in which the electric wire 14 is conveyed (refer to FIG. 2). FIG. 2 respectively shows a situation in which the right electric wire holding hand 3 has advanced to the crimp working location of the terminal crimping pressing device 6*a* by means of the advancement actuator 15 and a situation in which the left electric wire holding hand 3 has been removed from the crimp working location by means of the advancement actuator 15. The advancement actuator 15 comprises of a servomotor and a ball screw. Each of the above-described actuators 5*a*, 5*b*, 15 may have configurations other than the one using a servomotor and a ball screw.

The terminal crimping device includes a grip-substituting hand 4 placed between the stripping section 10 and the terminal crimping section 6, and which receives the electric wire 14 whose jacket is stripped off on both ends from the first electric wire conveying hand 1 and passes it to the second electric wire conveying hand 2. The grip-substituting hand 4 is installed right before the terminal crimping section 6.

Figure 3:
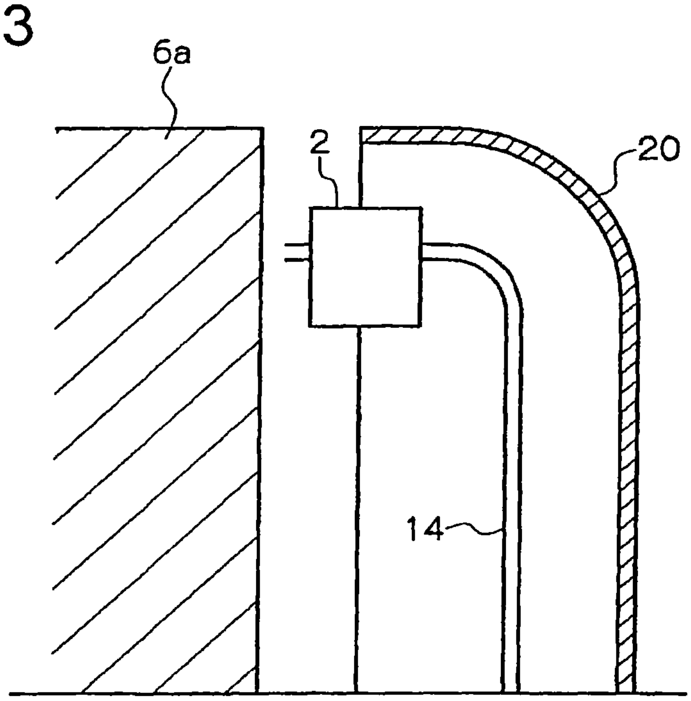
FIG. 3 depicts a cross-section view showing the cover for the electric wire of the electric wire terminal crimping device according to the first embodiment of the invention.

As shown in FIG. 1 and FIG. 3, the terminal crimping device includes an electric wire protecting cover 20 that at least covers outer side of the electric wire 14 for entire area in which the electric wire 14 moves from the first terminal crimping pressing device 6*a* to the last terminal crimping pressing device 6*a* (fourth pressing device in this example) among the four terminal crimping pressing devices 6*a*.

In the terminal crimping device, position of the terminal-attached electric wire 14*a* (refer to FIG. 4), which have been respectively crimped at both ends where the jacket has been stripped off at the terminal crimping section 6, is fixed in up-down and left-right direction at the terminal-position regulating section 7 at the next step, and is passed on to the terminal-inserting hand 11*a*.

Figure 4:
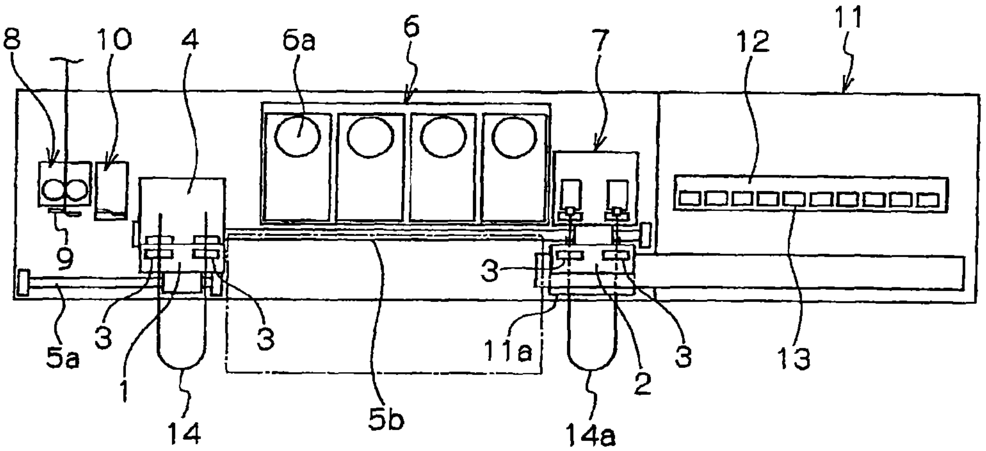
FIG. 4 depicts a process illustration showing a condition which is different from that of FIG. 1 for the electric wire terminal crimping device according to the first embodiment of the invention.
Figure 5:
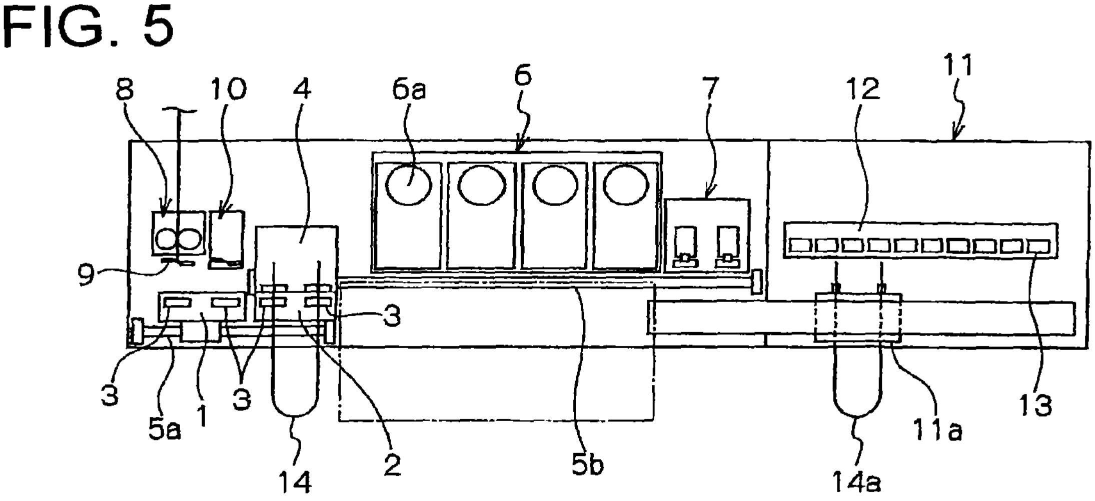
FIG. 5 depicts a process illustration showing a condition which is different from that of FIG. 4 for the electric wire terminal crimping device according to the first embodiment of the invention.

The terminal-inserting hand 11*a* is a robot having X-Y-Z axes and after fixing the position of the electric wire 14*a* in up-down and left-right direction, it holds and conveys the terminal-attached electric wire 14*a* from the position shown in FIG. 4 to the position shown in FIG. 5. In the position shown in FIG. 4, the terminal-inserting hand 11*a* inserts the terminals of the terminal-attached electric wire 14*a* in the connector housing 13 which is placed in the connector receiving jig 12 positioned in the terminal-inserting section 11.

In the terminal crimping device configured as such, the electric wire 14 is fed by a fixed amount at the electric wire measurement section 8 and the electric wire 14 is passed into a U-turn mechanism (not illustrated), and thereby, the downstream side terminal of the electric wire 14 is made to do a U-turn and then held with the electric wire holding hand 1. Thereafter, the electric wire 14 is measured and fed at the electric wire measurement section 8. After the measurement ends, the electric wire 14 is cut by a cutter 9 and its upstream side terminal is held with the electric wire holding hand 1. At this point, both ends of the electric wire 14 which has been measured and cut are held with the electric wire holding hand 1 and form a U-shape. The wire is conveyed to each process section in this form.

Then, jacket on both ends of the U-shaped electric wire 14 is stripped off at the stripping section 10, and thereafter during the next process in the terminal crimping section 6, terminals are crimped at both ends by the first terminal crimping pressing device 6*a* among the four terminal crimping pressing devices 6*a*. Upon crimping the terminals, the advancement actuator 15 moves (advances) the two electric wire holding hands 3, 3 provided in the second electric wire conveying hand 2 to the crimp working position of the terminal crimping pressing device 6*a*, and thereby, the terminals are crimped.

At the next terminal-position regulating section 7, position of the terminal-attached electric wire 14*a* which have been crimped the terminals at its ends is fixed in up-down and left-right direction, and passed on to the terminal-inserting hand 11*a*. After the terminal-inserting hand 11*a* fixed the position of the terminal-attached electric wire 14*a* at the terminal-position regulating section 7 in up-down and left-right direction at a position shown in FIG. 4, it conveys the terminal-attached electric wire 14*a* to the terminal-inserting section 11 shown in FIG. 5, and inserts the terminals of the terminal-attached electric wire 14*a* (e.g., female terminal section of the terminals) into the connector housing 13 placed in the connector receiving jig 12.

FIG. 12 and FIG. 13 depicts a typical terminal-attached electric wire 14*a* in which terminals 200 have been respectively crimped at both ends. In FIG. 13, symbol 14*b* indicates insulating sheath of the electric wire 14, and symbol 14*c* indicates a plurality of core wires (conductor exposed section) whose insulating sheath 14*b* has been stripped off for a predetermined length from end of the electric wire 14 at the stripping section 10. In FIG. 12 and FIG. 13, the symbol 201 indicates a female terminal section of the terminal 200 and symbol 202 indicates an insulation barrel crimped to the insulation sheath 14*b* at the terminal crimping section 6, and symbol 203 indicates a wire barrel crimped to the core wires 14*c* at the terminal crimping section 6. The female terminal section 201 of the terminal 200 is inserted by a male terminal section of the connector housing 13 and it is electrically connected to the male terminal section.

Thus, in the terminal crimping device according to the present example, the first electric wire conveying hand 1 that respectively holds both ends of the electric wire 14 with the two electric wire holding hands 3 is moved from the electric wire measurement section 8 to the stripping section 10 by means of the first conveying operation actuator 5*a*, and after the stripping section 10, as shown in FIG. 4, it passes the electric wire 14 to the grip-substituting hand 4 right before the terminal crimping section 6, and returns to the electric wire measurement section 8 driven by the first conveying operation actuator 5*a*. The electric wire 14 which is passed on from the first electric wire conveying hand 1 and held with the grip-substituting hand 4 is passed on to the second electric wire conveying hand 2 at a position shown in FIG. 4. In other words, both ends of the electric wire 14 are respectively held with the two electric wire holding hands 3 of the second electric wire conveying hand 2 at a position shown in FIG. 4.

The second electric wire conveying hand 2 that respectively holds both ends of the electric wire 14 with the two electric wire holding hands 3 is driven by the second conveying operation actuator 5*b*, and it is moved so that the right end of the electric wire 14 is placed at the installation location of the first terminal crimping pressing device 6*a* specified among the four terminal crimping pressing devices 6*a* (refer to FIG. 1). At this location, the advancement actuator 15 on the right as shown in FIG. 2 moves the right electric wire holding hand 3, which holds right end of the electric wire 14 to the crimp working location of the first terminal crimping pressing device 6*a* in a vertical direction. The terminal is crimped at right end of the electric wire 14 by means of the terminal crimping pressing device 6*a* at this location. Thereafter, the right advancement actuator 15 removes the right electric wire holding hand 3 from the crimp working location.

After the terminal crimping process on the right side of the electric wire is thus performed, the second electric wire conveying hand 2 is driven by the second conveying operation actuator 5*b* in a situation in which the hand respectively continues to hold both ends of the electric wire 14 with the two electric wire holding hands 3, and is moved so that left end of the electric wire 14 is placed at the installation location of a first terminal crimping pressing device 6*a*. At this location, the left advancement actuator 15 as shown in FIG. 2 moves the left electric wire holding hand 3 which holds left end of the electric wire 14 to the crimp working location of the first terminal crimping pressing device 6*a* in a vertical direction. At this location, the terminal is crimped at left end of the electric wire 14 by means of the terminal crimping pressing device 6*a*. Thereafter, the advancement actuator 15 on the left side removes the left electric wire holding hand 3 from the crimp working location.

The terminal-attached electric wire 14*a* in which terminals have been crimped at both ends by means of the terminal crimping pressing device 6*a* is moved from a position where the left end of the electric wire 14 is positioned in the installation position of the first terminal crimping pressing device 6*a* to the position shown in FIG. 4, driven by the second conveying operation actuator 5*b*.

The terminal-attached electric wire 14*a* that is conveyed to the position shown in FIG. 4 is passed from the second electric wire conveying hand 2 to the terminal-inserting hand 11*a*. The second electric wire conveying hand 2 which has ceased holding the terminal-attached electric wire 14*a* returns from the position shown in FIG. 4 to the position shown in FIG. 1.

By repeating such type of operations continuously, the electric wire is conveyed from the upstream process (electric wire measurement section 8) in which the electric wire is measured to the final process at the terminal-inserting section 11 in which the terminal-attached electric wire 14*a* is inserted in the connector housing 13.

The following are functions and advantageous effects of the first embodiment configured as described in the above.

(a) In the electric wire conveying means 18, as the electric wire 14 is conveyed from one side of the plurality of terminal crimping pressing device 6*a* to another side without the electric wire being grip-substituted, even if the number of terminal crimping pressing devices 6*a* increases or the conveyance speed of the electric wire 14 becomes faster, defective terminal crimping in products due to holding failure on the electric wire 14 is prevented.

(b) In the above-described prior art electric wire terminal crimping device, since there are a plurality of pressing device 60*a* for crimping the terminals, frequency of grip-substituting of the electric wire 140 increases between the electric wire holding hand 101 and electric wire conveying hand 103. As the electric wire undergoes grip-substituting, it results in changes in its posture such as rotating around a longitudinal axis. Thus, if there is a change in the posture of the electric wire, it leads to problems in the process performed thereafter.

For example, direction of the axis itself of the electric wire may change and a situation may arise in which terminal crimping fails. Further, for example, change in posture of the electric wire that could be regulated well may occur right before inserting the terminal of the terminal-attached electric wire 140*a* into the connector housing 130. Thus, if changes in the posture of the electric wire occurred to be in a situation in which it is not possible to regulate the position of the terminal, the terminal cannot be held correctly with the terminal-inserting hand 110*a*, and the terminal cannot be inserted into the connector housing 130, which results in a defective product.

In contrast, in accordance with the present embodiment, the electric wire conveying means 18, conveys the electric wire 14 from one side of the plurality of terminal crimping pressing device 6*a* to another side without the electric wire 14 being grip-substituted, there is no change in posture of the terminal position after the terminals are crimped. Thus, it is possible to prevent a situation where the terminal crimping is unable due to changes in direction of the axis of the electric wire, or a situation where changes in posture that cannot be regulated well occur right before inserting the terminal of the terminal-attached electric wire 14*a* into the connector housing. Thereby, terminal-attached electric wire 14*a* can be provided to the terminal-inserting section 11 with stability, and it is able to prevent defective products arising from changes in posture of the terminal.

(c) The electric wire 14 is moved from the stripping section 10 to the terminal crimping section 6 and terminal crimping process is performed for the electric wire 14 by the terminal crimping pressing device 6*a* as well, in a situation in which both ends of the wire are respectively held with the two electric wire holding hands 3 of the second electric wire conveying hand 2. The terminal-attached electric wire 14*a* that underwent the terminal crimping process is moved to the position shown in FIG. 4 driven by the second conveying operation actuator 5*b*, in a situation where both ends of the wire are respectively held with the two electric wire holding hands 3 of the second electric wire conveying hand 2. In this position, the terminal-attached electric wire 14 is passed from the second electric wire conveying hand 2 to the terminal-inserting hand 11*a*.

Thus, the electric wire is not released nor substituted at the terminal crimping section 6. In other words, the second electric wire conveying hand 2 of the electric wire conveying means 18 conveys the electric wire from one side of the plurality of terminal crimping pressing devices 6*a* to another side without the electric wire being grip-substituted, and thereby, there is no change in posture of the terminal after the terminal is crimped. Thus, it is able to prevent a situation where there is a change in direction of the axis of the electric wire which makes the terminal crimping failure, or a situation where changes in posture that cannot be regulated well occur right before inserting the terminal of the terminal-attached electric wire into the connector housing. Thereby, the terminal-attached electric wire can be provided to the terminal-inserting section with stability, and it is able to prevent defective products arising from the changes in posture of the terminal.

(d) Since the electric wire is not released nor substituted at the terminal crimping section 6, there will be no mistakes during the process of holding performed by the electric wire holding hands.

(e) Two electric wire holding hands 3 are respectively provided in the first electric wire conveying hand 1 and the second electric wire conveying hand 2 for holding both ends of the electric wire 14, and thereby, only four electric wire holding hands 3 are needed. Thus, the structure can be simplified and faults in the mechanism can be reduced due to the simple structure.

(f) The two electric wire holding hands 3, 3 which are provided in the second electric wire conveying hand 2 are each provided with an advancement actuator 15 which moves the electric wire holding hands 3 to the crimp-working location of the terminal crimping pressing device 6*a* in a direction perpendicular to the direction in which the electric wire 14 is conveyed. With the above configuration, moving distance of the terminal crimping pressing device 6*a* towards the crimp-working location can be suitably set with the advancement actuators 15 respectively provided in the two electric wire holding hands 3 of the second electric wire conveying hand 2, and thereby, changing the advancing distance towards the crimp-working location becomes easy in case of change in the terminal. For example, it will be easier to deal with in a situation where there are several specifications for products manufactured with the device and where the terminals to be crimped are changed when manufacturing is done by interchanging the stages and correspondingly the distance for which the electric wire advances also changes.

(g) The advancement actuators 15 may be provided one for two the electric wire holding hands 3, i.e., two advancement actuators 15 in total. Thereby, it is not necessary to provide with the advancement actuators 15 one for each of the plurality of terminal crimping pressing devices 6*a*. This results in simplification of the mechanism.

(h) Since the grip-substituting of the electric wire is done only once by the grip-substituting hand 4 between the electric wire measurement section 8 and the terminal crimping section 6, damage done to the electric wire 14 with the two electric wire holding hands 3 respectively provided in the first electric wire conveying hand 1 and second electric wire conveying hand 2 can be prevented.

(i) The terminal crimping device includes an electric wire protecting cover 20 that covers outer side of the electric wire 14 for the entire area in which the electric wire 14 moves from the first terminal crimping pressing device 6*a* to the last among the four terminal crimping pressing devices 6*a*. With such configuration, warp of the electric wire 14 and the terminal-attached electric wire 14*a* that occurs when the electric wire is conveyed at a very high speed in the terminal crimping section 6 can be prevented with the electric wire protecting cover 20.

Second Embodiment

In the following, an electric wire terminal crimping device according to a second embodiment of the present invention will be described referring to FIG. 6.

The electric wire terminal crimping device according to the present embodiment is configured such that the electric wire 14 and the terminal-attached electric wire 14*a* is conveyed by an electric wire conveying hand 1' from the electric wire measurement section 8 to the terminal-position regulating section 11. Therefore, in the present embodiment, comparing with the above first embodiment, the grip-substituting hand 4 is eliminated and a single electric wire conveying hand 1' is provided replacing the above-described two electric wire conveying hands 1 and 2. Moreover, a single conveying operation actuator 5*b*' which reciprocates the electric wire conveying hand 1' between the electric wire measurement section 8 and the terminal-position regulating section 11 is provided replacing the two conveying operation actuators 5*a* and 5*b* which drive the two electric wire conveying hands 1 and 2. The remaining configuration of the second embodiment is similar to that of the first embodiment.

The second embodiment configured as such has the following functions and advantageous effects in addition to those of the first embodiment.

(j) The structure is further simplified since the electric wire 14 and terminal-attached electric wire 14*a* are conveyed by a single electric wire conveying hand 1' from the electric wire measurement section 8 to the terminal-position regulating section 11.

(k) Since the electric wire conveying hand 1' is reciprocated between the electric wire measurement section 8 and the terminal-position regulating section 11 by controlling the drive of a single conveying operation actuator 5*b*', only a single control system for the conveying operation actuator 5*b*' is needed and thereby the structure is further simplified.

Third Embodiment

In the following, an electric wire terminal crimping device according to a third embodiment of the present invention will be described referring to FIG. 7.

The electric wire terminal crimping device according to the present embodiment is provided with a waterproof-rubber-plug insertion segment 30 between the electric wire measurement segment 8 and the stripping segment 10 in the first embodiment. The waterproof-rubber-plug insertion segment 30 is provided with a rubber Plug insertion unit 31 and a parts feeder 32. The arrangement for other parts is identical to that of the first embodiment.

At the waterproof-rubber-plug insertion segment 30, waterproof rubber plugs supplied from the parts feeder 32 are inserted in vicinity of both ends of the electric wire 14, respectively. The waterproof rubber plug improves waterproofing performance by blocking a space between outer-circumference surface near the terminals crimped at both ends of the terminal-attached electric wire 14*a* and inner-circumference surface of the electric wire passage hole of the connector housing 13.

According to the third embodiment configured as such, the following functions and advantageous effects are accomplished in addition to those of the first embodiment.

(l) A wire harness assembly with improved waterproofing performance can be made since waterproof rubber plugs can be inserted respectively near both ends of the electric wire 14 by means of the waterproof-rubber-plug insertion segment 30 installed between the electric wire measurement segment 8 and the stripping segment 10.

Fourth Embodiment

In the following, an electric wire terminal crimping device according to fourth embodiment of the present invention will be described referring to FIG. 8.

Compared with the first embodiment, the electric wire terminal crimping device according to the present embodiment is additionally provided with an image inspection segment 40 between the terminal crimping section 6 and the terminal-position regulation segment 7 for inspecting terminal crimping condition. The image inspection segment 40 is equipped with an imaging test unit 42 including two cameras 41, 41 for recording images for both ends of the terminal-attached electric wire 14*a*.

According to the fourth embodiment configured as such, the following functions and advantageous effects are accomplished in addition to those of the first embodiment.

(m) The terminal crimping situation for both ends of the terminal-attached electric wire 14*a* can be inspected simultaneously with two cameras 41, 41 after the terminal crimping section 6.

Fifth Embodiment

In the following, an electric wire automatic ejection device according to the fifth embodiment will be described referring to FIG. 9.

The electric wire automatic ejection device according to the present embodiment is an electric wire automatic ejection device that performs cutting of the electric wire 14, terminal crimping on both ends of the electric wire 14, and ejection of the terminal-attached electric wire 14*a*, wherein the electric wire is conveyed in the terminal crimping section 6 where a plurality of terminal crimping pressing devices 6*a* is equipped, without the electric wire 14 or the terminal-attached electric wire 14*a* being grip-substituted.

Compared with the electric wire terminal crimping device according to the first embodiment, the electric wire automatic ejection device eliminated the terminal-insertion section 11 and is provided with an electric wire ejection segment 50. In the electric wire ejection segment 50, the terminal insertion hand 11*a* of the first embodiment has been replaced with an electric wire ejection unit 51 and an evacuation tray 52 for picking up and ejecting the terminal-attached electric wire 14*a*.

In accordance with the fifth embodiment configured as such, the following functions and advantageous effects can be accomplished.

(n) Since there are no release nor substitution of the electric wire at the terminal crimping section 6, there are no changes in posture of the terminal after crimping of the terminal, and thereby, it is able to eject the terminal-attached electric wire 14*a* of a same posture into the evacuation tray 52.

Sixth Embodiment

In the following, an electric wire terminal crimping device according to a sixth embodiment of the present invention will be described referring to FIGS. 14-18.

As described above in the first embodiment, after receiving the electric wire 14 at the grip-substituting hand 4, the second electric wire conveying hand 2 moves to a location of a terminal crimping pressing device 6*a* equipped with terminals to be crimped, among four terminal crimping pressing devices 6*a* at the terminal crimping section 6, without stopping. Then, after the terminal crimping is completed, position of the terminal-attached electric wire 14*a* is fixed in up-down and left-right directions with the terminal insertion hand 11*a*, and thereafter, it is conveyed from the position shown in FIG. 4 to the position shown in FIG. 5.

Upon the electric wire 14 or the terminal-attached electric wire 14*a* is conveyed as such, the electric wire 14 or the terminal-attached electric wire 14*a* moves from one side (left side) of the four terminal crimping pressing devices 6*a* to another side (right side) in a situation where its both ends are held with the electric wire holding hands 3, 3 of the second electric wire conveying hand 2. FIG. 18(A) shows a behavior of the electric wire 14 upon the electric wire 14 moves from said one side to another side (Hereinafter, this direction is referred to as direction (x).). During the course of the movement, if the electric wire 14 is relatively long, the U-shaped (loop-shaped) mid-section area of the wire fails to follow the movement of the second electric wire conveying hand 2, and thereby, it gives rise to a phenomenon in which the wire is bent and is swung in opposite direction to the moving direction (x), as shown in right side of FIG. 18(A). At this moment, the electric wire 14 is bent and is swung as shown in right side of FIG. 18(A) with fulcrum point at a position held by the electric wire holding hands 3, 3. At this moment, the faster the moving speed of the second electric wire conveying hand 2, the harder the electric wire 14 swings itself, and consequently, the swung electric wire 14 may coil-around the terminal crimping pressing device 6*a* and other mechanisms.

Therefore, since the moving speed of the second electric wire conveying hand 2 can be set only in a range in which the swinging of the electric wire 14 becomes small, the conveying speed of the electric wire 14 cannot be made faster, and consequently, the device may not operate efficiently. Depending on the individual characteristics of the electric wire 14, similar phenomenon may arise even if the moving speed of the second electric wire conveying hand 2 is slow, and consequently, it may cause defective products such as damages to the electric wires, and equipment breakdown.

To solve such problems, the electric wire terminal crimping device according to the present embodiment is characterized in having the following arrangement.

(1) As shown in FIGS. 14-17, the electric wire terminal crimping device according to the present embodiment is comprised of: guide rods 302, 302 that act as electric wire anti-swinging units for regulating position of both sides of U-shaped (loop-shaped) electric wire 14; and actuators 303, 303 that act as anti-swinging unit driving means for driving the has been installed to conduct the position-control of both sides of the guide rods 302, 302.

The guide rods 302, 302 regulate positions of both sides of the loop-shaped electric wire 14 at locations in outer side of the loop-shaped electric wire 14 with its both ends held with two electric wire holding hands 3 of the second electric wire conveying hand 2 so that the wire formed a loop-shape and are apart from locations where both ends of the wire are held with two electric wire holding hands 3 towards direction (y) shown in FIG. 14.

The actuators 303, 303 moves the guide rods 302, 302 between a first position (protrusive position shown in FIGS. 16 and 17) located in a motion trajectory of the electric wire 14 upon the electric wire is conveyed between one side (left side) of the plurality of the terminal crimping pressing device 6*a* to another side (right side), and a second position (retracted position shown in FIGS. 14 and 15) retracted from the motion trajectory.

(2) The electric wire terminal crimping device according to the present embodiment includes a cover 304 for protecting inner-structure of the second electric wire conveying hand 2, guide rods 302, 302, and actuators 303, 303. The cover 304 is provided with two through-holes 304*a* (refer to FIG. 14) for enabling movement of the guide rods 302, 302 between the first position and the second position. The guide rods 302, 302 are respectively configured to pass through the through-holes 304*a* of the cover 304 and to protrude from inner side to outer side at the first position, and thereby, regulate the position of both sides of the loop-shaped electric wire 14.

(3) The electric wire terminal crimping device according to the present embodiment includes a plate-shaped electric wire-guide 305 that acts as an electric wire guiding member allocated on the cover 304 with spacing from the cover 304. Upon the electric wire 14 is conveyed between one side (left side) of the plurality of terminal crimping pressing device 6*a* to another side (right side), the electric wire 14 passes through spacing (Dy) (refer to FIG. 14) between the cover 304 and the electric wire guide 305.

(4) When the guide rods 302, 302 are positioned at the first position, they are enabled to be in contact with outer-portion of the electric wire at both sides of the loop-shaped electric wire 14.

The operation of the electric wire terminal crimping device according to the present embodiment configured as such will be described.

After the electric wire 14 is measured and cut and reached to the grip-substituting hand 4, the second electric wire conveying hand 2 moves to the grip-substituting hand 4 and receives the electric wire 14. At this moment, simultaneously, the guide rods 302, 302 rise upwards driven by the actuator 303, pass through the through-holes 304*a* of the cover 304 and protrude to the outer side of the cover 304 (refer to FIG. 16 and FIG. 17), and guide outer side of the electric wire 14. At this point, as shown in FIG. 16, the guide rods 302, 302 are positioned at locations farther from the end of the electric wire 14 compared with the two electric wire holding hands 3 of the second electric wire conveying hand 2, i.e., at locations apart from the electric wire holding hands 3 in right direction (direction (z)) that is center side of the loop-shaped electric wire 14 when viewed from the electric wire holding hands 3 in FIG. 14.

Thereafter, the second electric wire conveying hand 2 speedily moves from one side (left side) of the four terminal crimping pressing devices 6*a* to another side (right side), and after completing the terminal crimping process, the second electric wire conveying hand 2 speedily further moves to the terminal-position regulating section 7 side. During such speedy move, the electric wire 14 passes through the gap (Dy) (as shown in FIG. 14 as a gap towards direction (y)) allocated above the guide rods 302, 302 (as shown in FIG. 14 at a location apart in direction (y)), between the electric wire guide 305 and the cover 304. After the second electric wire conveying hand 2 arrived at the terminal-position regulating section 7, the guide rods 302 moves downwards to the second position driven with the actuators 303, 303 and is positioned at inner side of the cover 304. Thereafter, the terminal-attached electric wire 14*a* is passed on to the terminal insertion hand 11*a*, and the second electric wire conveying hand 2 returns to the grip-substituting hand 4 in a situation where the guide rods 302, 302 are moved downwards to the second position.

As described in the above, upon the second electric wire conveying hand 2 speedily moves from one side (left side) of the four terminal crimping pressing devices 6*a* to another side (right side), and further to the terminal-position regulating section 7 side after completing the terminal crimping, the electric wire 14 or the terminal-attached electric wire 14*a* is swung up in an opposite direction to the moving direction (x).

However, the positioning of both sides of the U-shaped (loop-shaped) electric wire 14 is regulated by the guide rods 302, 302, and a fulcrum point where the electric wire 14 bends is located around the guide rods 302, 302 allocated at a location apart from a location where both ends of the electric wire 14 are held with the two electric wire holding hands 3 towards direction (y) in FIG. 14, as shown in right side of FIG. 18(B). Therefore, the rising of the electric wire in an opposite direction to the moving direction (x) is prevented. Thus, it is able to prevent the swung electric wire 14 or terminal-attached electric wire 14*a* from coiling around the terminal crimping pressing device 6*a* or other machine parts.

The sixth embodiment configured as such accomplishes the following functions and advantageous effects in addition to those of the first embodiment.

(o) Upon the second electric wire conveying hand 2 speedily moves from one side (left side) of the four terminal crimping pressing devices 6*a* to another side (right side) and further to the terminal-position regulating section 7 side after the terminal crimping is completed, both sides of the U-shaped electric wire 14 is regulated by the guide rods 302, 302, and as shown in FIG. 18(B) on its right side, a fulcrum point where the electric wire 14 bends is located around the guide rods 302, 302 allocated at a location apart from a location where both ends of the electric wire 14 are held with the two electric wire holding hands 3 towards direction (y) in FIG. 14. Therefore, the swinging of the electric wire 14 or the terminal-attached electric wire 14*a* towards opposite direction to the moving direction (x) (refer to the right side of FIG. 18(B)). Thereby, the swung electric wire 14 or terminal-attached electric wire 14*a* is prevented from coiling around the terminal crimping pressing device 6*a* or to other machine parts.

(p) Since the swinging of the electric wire 14 becomes small upon the speedily movement, the movement speed of the second electric wire conveying hand 2 can be set faster and the conveying speed of the electric wire 14 is increased, and thereby, an efficient device operation is enabled.

(q) Depending on the individual characteristics of the electric wire 14, the phenomenon of swinging of the electric wire 14 may arise even if the moving speed of the second electric wire conveying hand 2 is slow. However, the swinging of the electric wire 14 can be made smaller, and thereby, defective products such as damage to the electric wire is decreased and the yield is improved, and the possibility of device breakdown is decreased.

(r) The inner structure of the second electric wire conveying hand 2, the guide rods 302, 302, and the actuators 303, 303 are protected with the cover 30.

(s) During the speedily movement, the electric wire 14 passes through the spacing (Dy) (refer to FIG. 14), which is located between the cover 304 and the electric wire guide 305, and by making the spacing (Dy) narrow to the extent the electric wire 14 can pass through it, the swinging of the electric wire 14 upwards above the cover 304 (towards direction (y)) is prevented by stopping it at the electric wire guide 305.

During the speedily movement, crossing over of the electric wire traversing the guide rods 302, 302 is prevented with the electric wire guide 305.

Seventh Embodiment

The electric wire terminal crimping device according to a seventh embodiment of the invention will be described with reference to FIG. 19 and FIG. 20.

The electric wire terminal crimping device according to the sixth embodiment includes a plate-shaped electric wire guide 305 that acts as an electric wire guiding member, allocated with spacing (Dy) (refer to FIG. 14) between itself and the cover 304 in front of 304, and wherein upon the electric wire 14 being conveyed between one side (left side) of the plurality of terminal crimping pressing device 6*a* and another side (right side), the electric wire passes through the spacing (Dy). Thereby, it is able to suppress the electric wire 14 from swinging upwards (in direction (y)) from the cover 304 by stopping at the electric wire guide 305.

In comparison, in the electric wire terminal crimping device according to the present embodiment, upon the electric wire 14 being conveyed, it is configured to further suppress the electric wire 14 from swinging upwards (in direction (y)) from the cover 304A.

For this reason, the device includes a plate-shaped electric wire guide 305A that acts as an electric wire guiding member, allocated with spacing (Dz) (refer to FIG. 19) between itself and the cover 304A on the cover 304A.

Actuators 303A, 303A moves between a first position (a protrusive position shown in FIG. 20) which is located in motion trajectory of the electric wire 14 upon the electric wire 14 is conveyed between one side (left side) of the plurality of terminal crimping pressing device 6*a* and another side (right side), and a second position (a retracted position shown in FIG. 19) retracted from the motion trajectory, in direction (z).

Furthermore, the cover 304A for protecting inner structure of the second electric wire conveying hand 2, the guide rods 302A, 302A, and the actuators 303A, 303A is provided with two through-holes 304*b* for the guide rods 302A, 302A to move between the first position and the second position.

Each of the guide rods 302A, 302A passes through the through-hole 304*b* to protrude from inner side to outer side, and thereby, performing regulation of the position of both sides of the loop-shaped electric wire 14.

The seventh embodiment configured as such accomplishes the following functions and advantageous effects in addition to those of the sixth embodiment.

(t) The electric wire being swung upwards (in direction (y)) above the cover 304A upon the electric wire 14 being conveyed is further suppressed with a plate-shaped electric wire guide 305A allocated with spacing (Dz) between itself and the cover 304A on the cover 304A (refer to FIG. 19).

Eighth Embodiment

The electric wire terminal crimping device according to an eighth embodiment of the invention will be described with reference to FIGS. 21-23.

The seventh embodiment is comprised of: guide rods 302A, 302A that acts as electric wire anti-swinging unit, for regulating the position of both sides of the U-shaped (loop-shaped) electric wire 14; and actuators 303A, 303A that acts as anti-swinging unit driving means, for driving the guide rods 302A, 302A.

In contrast, the electric wire terminal crimping device according to the present embodiment is further improved from that of the seventh embodiment and is characterized in the following points:

- Instead of guide rods 302A, 302A that acts as electric wire anti-swinging unit, the device uses a dish-shaped guiding member 307 comprised of: a bottom wall 308 for supporting the loop-shaped electric wire 14; and side walls 309, 310 capable of contacting both sides of the loop-shaped electric wire 14.

The dish-shaped guiding member 307 is driven between a protrusive position where the electric wire 14 is supported with the bottom wall 308 and a retracted position retracted from the protrusive position, by an actuator 303B that acts as anti-swinging unit driving means.

- As shown in FIGS. 22 and 23, inner walls 311, 312 for regulating the position of both sides of the electric wire 14 cooperating with each of the side walls 309, 310 are provided on the bottom wall 308 of the dish-shaped guiding member 307.

The eighth embodiment configured as such accomplishes the following functions and advantageous effects in addition to those of the seventh embodiment.

(u) Since the dish-shaped guiding member 307 that acts as an electric wire anti-swinging unit is used, contacting area contacting with the electric wire 14 upon the electric wire 14 being conveyed is increased, and the swinging of the electric wire 14 or the terminal-attached electric wire 14*a* in opposite direction to the moving direction (x) is further suppressed.

(v) Inner walls 311, 312 for regulating the position of both sides of the electric wire 14 cooperating with each of the side walls 309, 310 are provided on the bottom wall 308 of the dish-shaped guiding member 307. According to this arrangement, the position of one side of the electric wire 14 loop-shaped due to the side wall 309 and the inner wall 311 is regulated, and the position of another side of the electric wire loop-shaped due to the side wall 310 and the inner wall 312 is regulated as well. Thereby, the swinging of the electric wire 14 or the terminal-attached electric wire 14*a* in opposite direction to the moving direction (x) is further suppressed.

Further, the present invention can be modified to be embodied as in the following:

The electric wire terminal crimping device has been described in the above embodiments, the present invention is widely applicable to methods for crimping a terminal of an electric wire as in the following:

A method for crimping terminals of an electric wire for cutting an electric wire and for crimping terminals to both ends of the electric wire, wherein the electric wire is conveyed from one side of a plurality of electric wire crimping means to another side allocated in a row in conveying direction of the electric wire, without the electric wire being grip-substituted, and the conveyance of the electric wire is capable of being stopped at a discretional one of the plurality of electric wire crimping means.

According to the method, since the electric wire is conveyed from one side of a plurality of electric wire crimping means to another side, without the electric wire being grip-substituted, even if the number of the electric wire crimping means increased or the conveying speed of the electric wire became faster, the holding failure for the electric wire is suppressed and defective products arising from the holding failure is prevented. Further, since the electric wire is conveyed from one side of a plurality of electric wire crimping means to another side, without the electric wire being grip-substituted, changes in posture of the terminal is avoided after crimping the terminal, and a situation where changes in posture that cannot be regulated well right before inserting the terminal of the terminal-attached electric wire into the connector housing is avoided. Thereby, the terminal-attached electric wire can be provided to the terminal-inserting section with stability, and it is able to prevent defective products arising from changes in posture of the terminal.

Further, the present invention is applicable to the following method for crimping terminals of an electric wire:

A method for crimping terminals of an electric wire, comprised of the following steps carried out in this order: an electric wire measuring step for measuring an electric wire and cutting it in a predetermined length; a stripping step for stripping jacket at both ends of the electric wire; a terminal crimping step for crimping a terminal to an end of the electric wire; a terminal position regulating step for regulating position of the terminal of the terminal-attached electric wire; and a terminal inserting step for inserting the terminal-attached electric wire to a connector housing; and wherein in said terminal crimping step, the electric wire is conveyed from one side of a plurality of electric wire crimping means to another side allocated in a row in conveying direction of the electric wire, without the electric wire being grip-substituted, and the conveyance of the electric wire is capable of being stopped at a discretional one of the plurality of electric wire crimping means.

According to the method, since the electric wire is conveyed from one side of a plurality of electric wire crimping means to another side in the terminal crimping step, without the electric wire being grip-substituted, even if the number of the electric wire crimping means increased or the conveying speed of the electric wire became faster, the holding failure for the electric wire is suppressed and defective products arising from the holding failure is prevented. Further, since the electric wire is not grip-substituted in the terminal crimping step, the terminal-attached electric wire can be provided to the terminal inserting step with stability, and it is able to prevent defective products arising from changes in posture of the terminal.

Although the above embodiments are described for arrangements having four terminal crimping pressing devices 6*a*, the present invention is not limited to four terminal crimping pressing devices 6*a* and is widely applicable to arrangements having a plurality of terminal crimping pressing device 6*a*.

With regards to the waterproof-rubber-plug insertion segment 30 according to the third embodiment, the device is able to deal with a plurality of types of rubber plugs by allocating a plurality of sets of the rubber plug inserting unit 31 and the parts feeder 32 and elongating the first conveying operation actuator 5*a*.

In the fourth embodiment, although the image inspection unit 42 for inspecting a condition of the crimping of the terminal is provided with two cameras 41, 41, both ends of the terminal-attached electric wire 14*a* may be recorded one end to the other sequentially using a single camera so that condition of the crimping of the terminal at its ends is inspected one end to the other sequentially.

In the first to fourth embodiments, a terminal having female terminal section (refer to female terminal section 201 in FIG. 12) is crimped at both ends of the electric wire 14 and the female terminal section is inserted into the connector housing 13, and thereby the female terminal section is electrically connected with the male terminal section in the connector housing. However, the invention is not limited to such an arrangement. That is, the invention is applicable to cases where a terminal having male terminal section is crimped at both ends of the electric wire 14 and the male terminal section is inserted into the connector housing 13, and thereby the male terminal section is electrically connected with the female terminal section in the connector housing.

In the sixth to eighth embodiments, positions for both sides of the loop-shaped electric wire are regulated. However, the invention is applicable to an electric wire terminal crimping device wherein a position for one side of the loop-shaped electric wire is regulated.

The electric wire terminal crimping devices according to the sixth to eighth embodiments are applicable to electric wire terminal crimping devices having arrangements having the electric wire protecting cover 20 for preventing swinging of the electric wire 14 and the terminal-attached electric wire 14*a* described in the first embodiment, or having arrangements without the electric wire protecting cover 20.

What is claimed is:

1. An electric wire terminal crimping device, comprising:

an electric wire crimping means for crimping a terminal at an end of an electric wire;

an electric wire conveying means for holding and conveying an end of said electric wire;

an electric wire measurement means for measuring the electric wire and cutting the electric wire in a predetermined length; and a stripping means for stripping a jacket on both ends of the electric wire, wherein a plurality of said electric wire crimping means is positioned in a row in a direction in which said electric wire is conveyed, said electric wire conveying means conveys said electric wire from one side of said plurality of electric wire crimping means to another side without said electric wire being grip-substituted, conveyance of said electric wire is capable of being stopped at a discretional one of said plurality of electric wire crimping means, and said electric wire conveying means includes:

a first electric wire conveying hand for conveying said electric wire from said electric wire measurement means to said stripping means;

a first driving means for reciprocating said first electric wire conveying hand between said electric wire measurement means and said stripping means;

a second electric wire conveying hand for conveying said electric wire from one side of said plurality of electric wire crimping means to another side; and a second driving means for reciprocating said second electric wire conveying hand between one side of said plurality of electric wire crimping means and another side.

2. The electric wire terminal crimping device according to claim 1, wherein two electric wire holding hands for holding both ends of said electric wire are respectively provided in said first electric wire conveying hand and said second electric wire conveying hand.

3. The electric wire terminal crimping device according to claim 2, wherein third driving means for moving the electric wire holding hands in a direction perpendicular to a conveying direction of said electric wire to a crimp working location of said electric wire crimping means is respectively provided in said two electric wire holding hands provided in said second electric wire conveying hand.

4. The electric wire terminal crimping device according to claim 2, further comprising:

an electric wire anti-swinging unit allocated in an outer side of said electric wire in which both ends of the electric wire are held with said two electric wire holding hands of said second electric wire conveying hand so that said electric wire is loop-shaped, for regulating position(s) of both sides or one side of said loop-shaped electric wire at position(s) apart from a location where said both ends of said electric wire are held with said two electric wire holding hands; and an anti-swinging unit driving means for moving said electric wire anti-swinging unit between a first position located in a motion trajectory of said electric wire upon which said electric wire is conveyed between one side of said plurality of electric wire crimping means to another side and a second position retracted from the motion trajectory.

5. The electric wire terminal crimping device according to claim 4, further comprising a cover for protecting internal structure of said second electric wire conveying hand, said electric wire anti-swinging unit, and said anti-swinging unit driving means, and wherein said electric wire anti-swinging unit is configured such that said electric wire anti-swinging unit protrudes from an inner side to an outer side of said cover to regulate position(s) on both sides or one side of the loop-shaped electric wire at said first position.

6. The electric wire terminal crimping device according to claim 5, further comprising an electric wire guiding member allocated such that there is spacing between itself the electric wire guiding member and the cover on the cover, and wherein upon the electric wire being conveyed between one side of said plurality of electric wire crimping means to another side, said electric wire passes through the spacing between the cover and the electric wire guiding member.

7. The electric wire terminal crimping device according to claim 4, wherein said electric wire anti-swinging unit is a guide rod capable of contacting an outer side of the electric wire at both sides or one side of the loop-shaped electric wire when said electric wire anti-swinging unit is in said first position.

8. The electric wire terminal crimping device according to claim 4, wherein said electric wire anti-swinging unit is a dish-shaped guiding member comprising: a bottom wall for supporting the loop-shaped electric wire while in said first position; and side wall(s) capable of contacting both sides or one side of the loop-shaped electric wire.

9. The electric wire terminal crimping device according to claim 8, wherein at least one inner wall for regulating position(s) on both sides or one side of the electric wire cooperating with the side wall is provided on the bottom wall of the dish-shaped guiding member.

10. The electric wire terminal crimping device according to claim 1, further comprising a grip-substituting hand allocated between said stripping means and said plurality of electric wire crimping means, for receiving the electric wire whose jacket is stripped off from said first electric wire conveying hand and for passing the electric wire on to said second electric wire conveying hand.

11. The electric wire terminal crimping device according to claim 1, further comprising an electric wire protecting cover for covering an outer side of said electric wire for an entire area in which said electric wire moves from first to last electric wire crimping means among said plurality of electric wire crimping means.

12. The electric wire terminal crimping device according to claim 1, wherein said electric wire conveying means includes a single electric wire conveying hand for conveying said electric wire from one of said plurality of electric wire crimping means for a prior process to one of said plurality of electric wire crimping means for a later process.

13. The electric wire terminal crimping device according to claim 1, wherein the first driving means is a first actuator, and the second driving means is a second actuator.

14. An electric wire terminal crimping device, comprising:

a plurality of electric wire crimping devices that crimp a terminal at an end of an electric wire, the plurality of electric wire crimping devices being positioned in a row in a direction in which said electric wire is conveyed;

an electric wire conveying device that holds and conveys an end of said electric wire;

an electric wire measurement section that measures the electric wire and cuts the electric wire in a predetermined length; and a stripping section that strips a jacket on both ends of the electric wire, wherein said electric wire conveying device conveys said electric wire from one side of said plurality of electric wire crimping devices to another side without said electric wire being grip-substituted, conveyance of said electric wire is capable of being stopped at a discretional one of said plurality of electric wire crimping devices, and said electric wire conveying device includes:

a first electric wire conveying hand that conveys said electric wire from said electric wire measurement section to said stripping section;

a first driving actuator that reciprocates said first electric wire conveying hand between said electric wire measurement section and said stripping section;

a second electric wire conveying hand that conveys said electric wire from one side of said plurality of electric wire crimping devices to another side; and a second driving actuator that reciprocates said second electric wire conveying hand between one side of said plurality of electric wire crimping devices and another side.

* * * * *